UNITED STATES PATENT OFFICE.

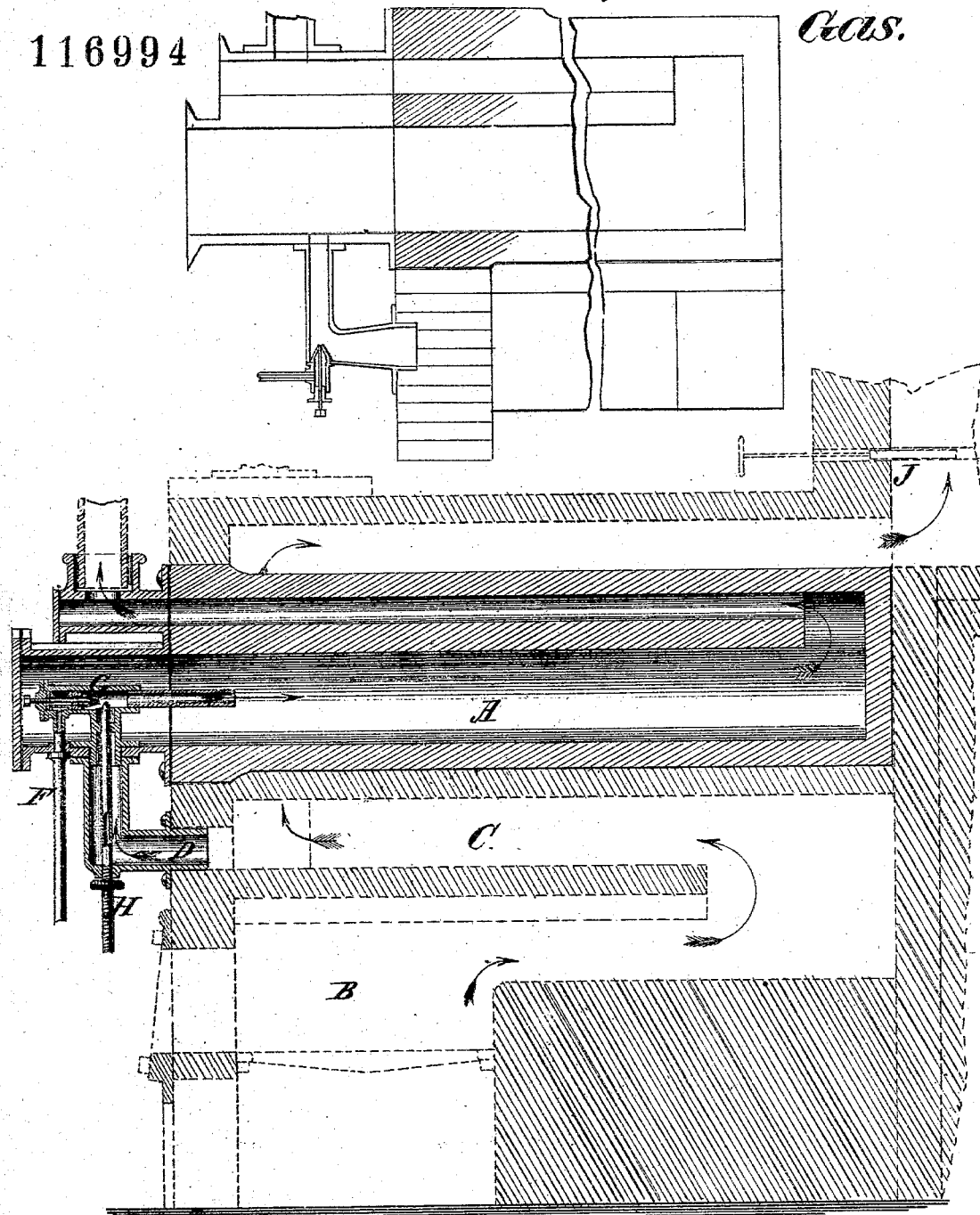

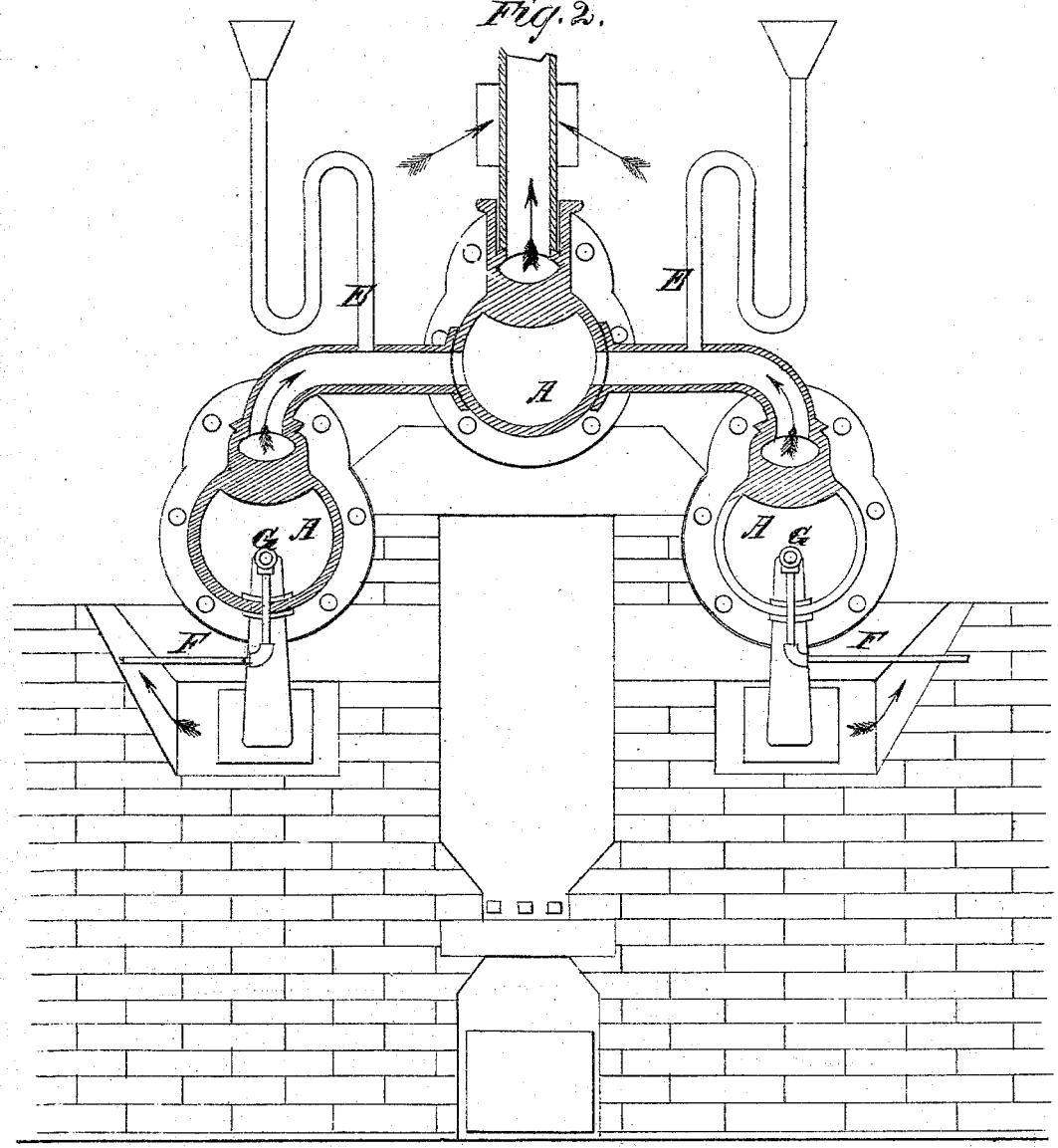

FREDERICK A. SABBATON, OF TROY, NEW YORK.

IMPROVEMENT IN THE MANUFACTURE OF HYDROCARBON GAS.

Specification forming part of Letters Patent No. 116,994, dated July 11, 1871.

*To all whom it may concern:*

Be it known that I, FREDERICK A. SABBATON, of Troy, in the county of Rensselaer and State of New York, have invented a new and useful Improvement in the Manufacture of Hydrocarbon Gas; and I do hereby declare that the following is a full, clear, and exact description thereof, which will enable others skilled in the art to make and use the same, reference being had to the accompanying drawing forming part of this specification.

The object of this invention is to furnish a superior quality of hydrocarbon gas for illuminating or heating purposes at a cheaper rate than the ordinary gas has hitherto been produced; and my invention consists in utilizing the heated gases or waste gaseous products of combustion for that purpose, such waste gases being generated in the furnace or fire-box beneath the retort in the ordinary process of manufacturing gas, or generated in furnaces employed for other purposes. It also consists in combining with such gases, in a retort, superheated or dry steam, and also in carbureting the hydrogen gas thus obtained in the retort by means of any carbonaceous substance or material, either solid or liquid, as coke, coal, petroleum, naphtha, oil, or any of the hydrocarbons, the apparatus employed in carrying out my invention being hereinafter more fully set forth and described.

In the accompanying drawing, Figure 1 represents a vertical longitudinal section of a retort and furnace with my improvement applied. Fig. 2 is a vertical cross-section of a "bench" of three retorts, showing my improvement applied in a modified form.

Similar letters of reference indicate corresponding parts.

A represents the retort; B, the fire-box. C is the flue above the fire-box or furnace, which receives the gaseous products of combustion. D is a bent tube or flue which conducts the gaseous products of combustion (either the whole or in portion) into the retort.

In this example of my invention I show the steam-injector, the flue for the gases from the furnace, and a tube for discharging a liquid hydrocarbon into the retort, all compactly arranged and operating upon the principle of the "Giffard injector;" but I do not confine myself to this particular arrangement, as I may, in some instances, dispense with the liquid hydrocarbon altogether, or introduce it into another retort, substantially as seen at E, sheet 2 of the drawing, and the injector may be placed over, under, or outside the retort, as shown in Fig. 3. In the retort I place coke, charcoal, mineral coal, or other carbonaceous substance or material, and, should such substance or substances, either separately or combined, sufficiently carburet the hydrogen for either illuminating or heating purposes, the liquid hydrocarbon may be unnecessary.

F is the steam-pipe. G is the injecting-tube. This current of dry or superheated steam induces a current of heated gases from the furnace, and, at the same time, carries the liquid hydrocarbon with it from the tube H. The steam, coming in contact with the incandescent coal or contents of the retort, is decomposed, the hydrogen is set free, while the oxygen combines with carbon, forming carbonic-acid and carbonic-oxide gases. The hydrogen takes up carbon, and the gases evolved pass off from the retort in the usual manner to the purifier and are prepared for use. As indicated by the arrows, a portion of the gaseous products of combustion passes through the retort, such gases being induced by the steam-jet, and a portion passes off to the chimney in the usual manner. The proportion in either direction may be regulated by the damper J.

By this arrangement nearly or quite the whole of the gaseous products of combustion may be made to pass through the retort and utilized as far as the character of those gases will allow. The result of this improvement is a very important saving of fuel in producing a given quantity of gas, while the gas itself possesses superior heating and illuminating power.

Having thus described my invention, I claim as new and desire to secure by Letters Patent—

1. Utilizing the heat and gaseous products of combustion by conveying them into a retort by means of and in combination with a current of dry or superheated steam for the production of hydrogen gas, substantially as described.

2. The arrangement of the steam-pipe F, the injection-tube G, the flue-tube D, and the oil-tube H, in combination with a furnace or fire-box and a gas-retort, substantially as and for the purposes described.

3. The flue D, substantially as and for the purposes shown and described, in combination with a furnace and a gas-retort.

FREDERICK A. SABBATON.

Witnesses:
    J. A. LANSING,
    THOS. J. GILCOYNE.